I. BLOUNT.
SEPARATOR.
APPLICATION FILED MAY 25, 1911.
1,057,214. Patented Mar. 25, 1913.
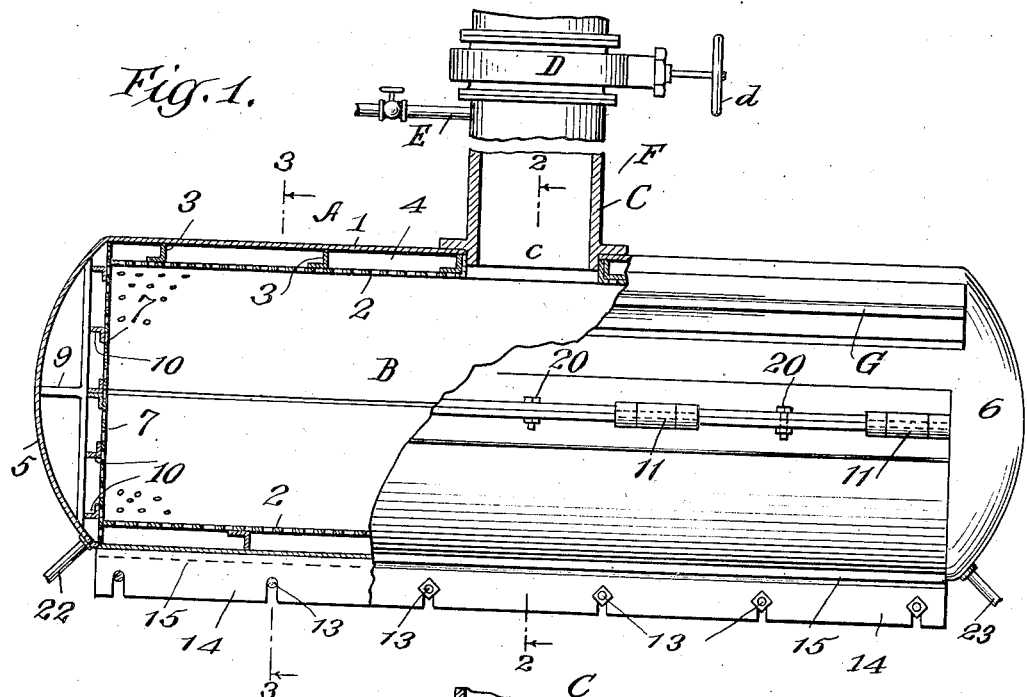
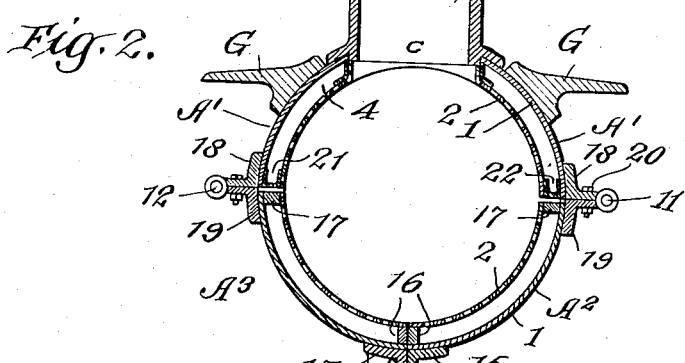
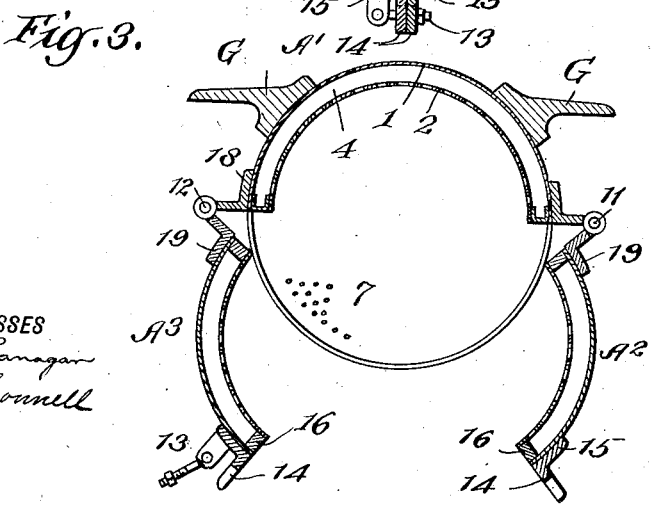
WITNESSES
INVENTOR
Irving Blount
BY
ATTORNEY

UNITED STATES PATENT OFFICE.

IRVING BLOUNT, OF NEW YORK, N. Y.

SEPARATOR.

1,057,214.

Specification of Letters Patent. Patented Mar. 25, 1913.

Application filed May 25, 1911. Serial No. 629,293.

*To all whom it may concern:*

Be it known that I, IRVING BLOUNT, a citizen of the United States, and a resident of the borough of Brooklyn, city and State of New York, have invented certain new and useful Improvements in Separators, of which the following is a specification.

This invention relates broadly to apparatus for separating liquid and solid constituents of a material containing both, and more particularly to apparatus for extracting oil, grease, water, etc., from garbage or other matter.

In a general way it may be stated that one of the important objects of the present invention is to provide a digester or separator of liquid and solid matters, which will economically separate said materials from each other and will reduce the time incident to the discharge of the solid residue to a minimum. This purpose, and others which will hereinafter appear, are fully secured in the construction illustrated in the accompanying drawings to exemplify what is regarded to be the best embodiment of the invention but to the details of which the invention is not, considered in its broader aspects, restricted, as changes may be made in the details and the essential features of the invention without departing from the spirit of the invention or the scope of the subjoined claims.

In the drawings, wherein like characters of reference denote corresponding parts: Figure 1 is a longitudinal view partly in elevation and partly in section of a digester or separator containing the present improvements. Fig. 2 is a vertical transverse section thereof on the line 2—2 of Fig. 1. Fig. 3 is a vertical transverse section on a line corresponding to the line 3—3 of Fig. 1, showing the digester open for the discharge of its contents.

The container A comprises an outer wall 1 and an inner wall 2 arranged in a spaced relation and separated from each other by stiffening and spacing members 3 which extend transversely thereof. Preferably, the container is of cylindrical form, as shown. The inner wall 2 is perforated as shown, or is otherwise such as to permit the liquid extracted from the material undergoing treatment and the fluid which is employed to cause such extraction to flow therethrough into the space 4 arranged between the walls 1 and 2. Solid heads 5 and 6 are provided at the ends of the container. These heads are preferably of concavo-convex form and obviously they form parts of the outer wall of the container. The treating chamber B, encircled by the inner wall 2 of the container, has its ends provided with plates 7 which are arranged at the ends of the walls 2 and are perforated or otherwise formed to permit the fluids to pass therethrough into the heads 5 and 6 respectively. The heads 5 and 6 are provided with internal bracing members 9 and 10.

As shown most clearly in Figs. 2 and 3 the container A is formed to provide an outer section A' and two lower sections $A^2$, $A^3$, each having the inner and outer walls 1 and 2 hereinbefore described. Each of these sections preferably extends throughout the entire length of the treating chamber B and they are complementary to each other, serving when closed to form said treating chamber. The section $A^2$ is hingedly connected at 11 to the bottom of the section A' at one side of the latter and the section $A^3$ is similarly hingedly connected, at 12, to the bottom of said section A' at the opposite side of the latter. The confronting edges of the sections $A^2$ and $A^3$ are provided with means whereby they may be securely locked together to enable the treatment of material to be carried on therein and whereby also they may be readily opened out for the discharge of the solid matter, that is, the residue left after the liquid content of the material has been removed from said material. This fastening means preferably consists of a series of pivoted bolts 13 which enter apertures in the flanges 14 projecting from members 15 which extend longitudinally of the respective sections $A^2$ and $A^3$ and stiffen the edges thereof. The lower edges of the sections $A^2$ and $A^3$ are each further stiffened by members 16 which extend longitudinally thereof and are arranged between the outer and inner walls 1 and 2 and serve also to close said edges. The opposite edges of said sections are similarly closed and stiffened by members marked 17. Each journal of the hinges 11 and 12 is preferably carried by complementary angle irons 18 and 19 secured to the confronting portions of the members A' and $A^2$ or $A^3$ and extending longitudinally of the latter and serving to stiffen the construction at this place. Fastening bolts 20 are preferably provided to hold the two members 19 and 20 rigidly together during the separating operation.

The member A' has its lower portion provided with troughs 21 and 22 which extend longitudinally thereof between the walls 1 and 2. The troughs are open upwardly and serve to convey the extracted liquid to the heads 5 and 6 and said heads are provided with drain pipes 22 and 23 by which said liquid is carried off to any desired place.

A drum or hopper C is arranged above the container A and opens into the treating chamber B of the latter. This drum or hopper is provided with a valve D having a hand wheel or other suitable means $d$ for operating it. At a place between the valve D and the mouth $c$ of the hopper or drum there is arranged an inlet pipe E for the steam or other fluid which is employed to separate the liquid content of the material from the solid matter thereof.

From the foregoing the operation of the invention will readily be understood to be as follows: The sections being in the position shown in Fig. 2 and the valve D being open a suitable quantity of material is introduced through the drum or hopper C into the treating chamber B. The valve D is then closed and steam or other selected fluid is admitted through the pipe E. This fluid is preferably under pressure sufficient to compact the material as well as being of a nature which extracts the liquid matter from the latter. The extracted matter and the fluid employed for the extraction flow through the walls 2 of the sections and through the perforated end wall 7. That portion of the liquid which flows through the walls of the upper section A' enters passages between the spacing members 3 and flows to the troughs 21 and 22 and thence into the heads 5 and 6. A portion of the fluid also flows through the plates 7 into said heads 5 and 6: and such portion as flows through the walls 2 of the sections A² and A³ ultimately reaches the heads 5 and 6. The spacing members 3 are apertured wherever it is necessary to provide for the intercommunication of the spaces between them in order that the liquid may be permitted to flow to said heads. When the liquid content of the material which has been placed in the chamber B has been extracted from said material, the residue will be found to be closely compacted in the body of the container. The flow of treating fluid is then cut off, the valve D is opened and more material is supplied to the chamber. This is treated in the manner already described and this sequence of operations is repeated until it becomes expedient to remove the solid residue from the treating chamber. In order to permit this removal it is only necessary to release the sections A² and A³ from each other and to swing them oppositely on their hinges 11 and 12 to the position shown in Fig. 3. When this has been done the interior of the treating chamber B will be fully exposed and will be open downward. The solid matter will therefore be freely and quickly discharged from said chamber. This discharge may be effected wholly by gravity, but if it is considered to be desirable, gravity may be assisted by the introduction into the chamber of air or other suitable fluid under pressure, drawn from a suitable source of supply. This discharging fluid may be supplied by a pipe F. If desired, the treating fluid may be employed to aid in the discharge of the solid material, but it is considered to be preferable to employ a separate fluid. Apparently also, even when a separate fluid is employed it may be introduced through the same pipe which is employed for the introduction of the treating fluid, by connecting the discharge end of the latter with the separate sources of supply to the treating fluid and discharging fluid.

In the use of the apparatus, it is preferred to supply a charge of material sufficient in quantity to reach up into the drum to a place immediately below the pipe E and to cut-off the supply of fluid and renew the charge when the previously-introduced charge has been compacted to a place at or immediately below the upper rows of perforations in the inner walls. This avoids waste of treating fluid. Preferably, the inner walls of the container are free from perforations at the top in order that the material may be compacted to a place below the top of the latter, before renewing the charge.

Preferably the apparatus is provided with brackets G by which it is supported in a suspended relation.

Having now described the invention what I believe to be new and desire to secure by Letters Patent, is:—

1. An apparatus of the class described, comprising a container having three complementary sections, two of which sections have their upper ends hingedly secured at opposite sides of the lower end of the third section, and means for securing the other ends of the hinged sections, adapted to release the same, each of said sections having an inner wall and an outer wall, relatively disposed to provide a liquid-receiving space between them, the inner wall being adapted to retain solid matter and to permit liquid matter to pass through it to said space.

2. In an apparatus of the class described, a container comprising a body and heads, each composed of inner and outer walls with a space between, the inner wall being adapted to retain solid matter and to permit liquid to flow to said space, the body of said container having a plurality of oppositely-movable sections.

3. In an apparatus of the class described, a container comprising a body and heads, each composed of inner and outer walls with a space between, the inner wall being adapted to retain solid matter and to permit liquid to flow to said space, the spaces between the walls of the body being so correlated to the spaces in the head that they will deliver liquid to the latter, and the body of said container having a plurality of oppositely-movable sections.

4. In an apparatus of the class described, a container comprising a body and heads, each composed of inner and outer walls with a space between, the inner wall being adapted to retain solid matter and to permit liquid to flow to said space, the body of said container comprising three complementary sections, two of which sections have their upper ends hingedly securely at opposite sides of the lower end of the third section, and said third section being provided with means for supplying it with material and treating fluid and having the space between its walls provided with means for conducting liquid to the spaces in the heads.

5. In an apparatus of the class described, a container comprising a body and heads, each composed of inner and outer walls with a space between, the inner wall being adapted to retain solid matter and to permit liquid to flow to said space, the body of said container comprising three complementary sections, two of which sections have their upper ends hingedly secured at opposite sides of the lower end of the third section, the space between the walls of the hinged body-sections being closed at the top and bottom and having their ends in communication with the spaces in the heads, the third section having troughs at opposite sides of its lower end, in the space between its walls, said troughs communicating with the spaces in the heads, the heads having means for the discharge of liquid therefrom, a valved means connected to the third section for conducting material to the interior of the body of the container, and a valved fluid-supply pipe entering the last-named means below the valve of the latter.

6. In an apparatus of the class described, a container comprising a body and heads, each composed of inner and outer walls with a space between, the inner wall being adapted to retain solid matter and to permit liquid to pass to said space, the body of said container comprising three complementary sections, two of which sections have their upper ends hingedly secured at opposite sides of the lower end of the third section, a valved means connected to the third section for conducting material to the interior of the body of the container and a valved fluid supply pipe entering the last-named means below the valve of the latter.

7. In an apparatus of the class described, a container comprising a body and heads, each composed of inner and outer walls with a space between, the inner wall being adapted to retain solid matter and to permit liquid to pass to said space, the body of said container comprising three complementary sections, two of which sections have their upper ends hingedly secured at opposite sides of the lower end of the third section, a valved means connected to the third section for conducting material to the interior of the body of the container and a valved fluid supply pipe entering the last-named means below the valve of the latter, the spaces between the walls of the sections of the body being closed to each other and each having its end in communication with the spaces in the heads, and said heads having means for the discharge of liquid therefrom.

8. In an apparatus of the class described, a container whose body is provided with inner and outer walls with a space between, a portion of the inner wall being adapted to retain solid matter and to permit liquid to flow therethrough to said space, and another part thereof being adapted to retain both solid matter and fluid, valved means connected to the container adjacent to the latter part for containing material to be treated and conducting the same to the valved means for supplying the treating fluid, the body of said container having oppositely-movable sections hingedly secured to opposite sides of the lower part of said body whereby solid matter may be dumped therefrom.

In witness whereof I have hereunto set my hand in the city, county and State of New York, this 24th day of May, 1911.

IRVING BLOUNT.

In presence of—
  ISABEL R. RICHARDS,
  JOHN J. RANAGAN.